(12) United States Patent
Ma et al.

(10) Patent No.: US 12,013,973 B1
(45) Date of Patent: Jun. 18, 2024

(54) METHOD AND APPARATUS FOR HEURISTICALLY DEFENDING AGAINST LOCAL ADVERSARIAL ATTACK

(71) Applicant: BEIJING UNIV CIVIL ENGN & ARCHITECTURE, Beijing (CN)

(72) Inventors: Xiaoxuan Ma, Beijing (CN); Sihan Shan, Beijing (CN); Boyang Sun, Beijing (CN); Fengfang Hua, Beijing (CN); Hantao Zhang, Beijing (CN); Kuncheng Lian, Beijing (CN); Xianlong Meng, Beijing (CN); Zeyu Feng, Beijing (CN)

(73) Assignee: BEIJING UNIV CIVIL ENGN & ARCHITECTURE, Beijing (CN)

( * ) Notice: Subject to any disclaimer, the term of this patent is extended or adjusted under 35 U.S.C. 154(b) by 0 days.

(21) Appl. No.: 18/506,123

(22) Filed: Nov. 9, 2023

(30) Foreign Application Priority Data

Apr. 7, 2023 (CN) .......................... 202310363416.9

(51) Int. Cl.
*G06T 5/00* (2024.01)
*G06F 21/64* (2013.01)
(Continued)

(52) U.S. Cl.
CPC ................ *G06F 21/64* (2013.01); *G06T 5/20* (2013.01); *G06T 5/50* (2013.01)

(58) Field of Classification Search
CPC .......... G06N 3/08; G06N 20/00; G06N 3/094; G06V 10/82; G06V 10/30; G06T 5/70;
(Continued)

(56) References Cited

U.S. PATENT DOCUMENTS 10,984,272 B1 * 4/2021 Shrivastava .............. G06T 5/70
2021/0300433 A1 * 9/2021 Vorobeychik ........ G06V 10/751
(Continued)

FOREIGN PATENT DOCUMENTS

| CN | 109191390 A | 1/2019 |
| CN | 114359653 A | 4/2022 |

OTHER PUBLICATIONS

Naseer, Muzammal, Salman Khan, and Fatih Porikli. "Local gradients smoothing: Defense against localized adversarial attacks." 2019 IEEE Winter Conference on Applications of Computer Vision (WACV). IEEE, 2019.*

(Continued)

*Primary Examiner* — Li Liu

(57) ABSTRACT

The present disclosure relates to a method and apparatus for heuristically defending against a local adversarial attack through gradient optimization. The method includes: processing an original image to obtain a gradient image; selecting a noise region in the gradient image and suppressing the noise region to form a defense patch; performing gradient enhancement on the original image to form a gradient-enhanced image; and projecting the defense patch onto the gradient-enhanced image to form a defense-processed image. The present disclosure can suppress high-frequency noise and prevent a deep neural network from being attracted by the high-frequency noise to make misjudgment, to suppress an adversarial patch. In addition, a contour and texture of the original image are enhanced by performing gradient enhancement on the original image, recognition by a classifier is facilitated, and image recognition accuracy is improved.

6 Claims, 22 Drawing Sheets

(51) Int. Cl.
*G06T 5/20* (2006.01)
*G06T 5/50* (2006.01)

(58) Field of Classification Search
CPC .. G06T 1/005; G06T 2207/20084; G06T 5/60
See application file for complete search history.

(56) References Cited

U.S. PATENT DOCUMENTS

2023/0022943 A1* 1/2023 Xiao ............... G06F 18/22
2023/0325982 A1* 10/2023 Kapoor ............ G06N 3/045
382/104

OTHER PUBLICATIONS

Shaham, Uri, et al. "Defending against adversarial images using basis functions transformations." arXiv preprint arXiv:1803.10840 (2018).*

* cited by examiner (a). Original input samples (b). Adversarial samples (a) Adversarial patch gradient image (b) Effect image after adversarial patch gradient suppression (a) Original input sample (b) First-order gradient image (c) Image processed by a low-pass filter (d) Adversarial sample (e) First-order gradient image (f) Image processed by a low-pass filter (a) Image before gradient enhancement (b) Gradient image (c) Gradient-enhanced image (a). Adversarial samples (b). Images processed through a LAAGO algorithm

| | No attack | 70×70 noise (approximately 3% of an image) | 80×80 noise (approximately 4% of the image) | 120×120 noise (approximately 10% of the image) |
|---|---|---|---|---|
| No defense | 78.24% | 11.95% | 8.65% | 6.79% |
| LGS[$\lambda$=3.7] | 72.65% | 68.59% | 68.15% | 67.49% |
| LGS[$\lambda$=2.3] | 73.30% | 61.10% | 60.60% | 60.02% |
| LGS[$\lambda$=1.9] | 73.95% | 50.00% | 48.85% | 48.50% |
| JPEG [Quality =30] | 71.73% | 33.13% | 22.65% | 12.6% |
| DW | 53.27% | 66.29% | 64.83% | 62.4% |
| TVM [Weight =20] | 72.89% | 3.78% | 2.17% | 1.02% |
| MF[Window = 5] | 71.75% | 29.20% | 29.10% | 27.15% |
| GF [Window =3] | 75.10% | 16.00% | 15.65% | 15.40% |
| L0[Parameter =3e-2] | 3.2% | 1.5% | 1.2% | 0.4% |
| LAAGO algorithm | 77.94% | 71.93% | 71.84% | 70.14% |

FIG. 9

| | No defense | LAAGO | LGS [λ =2.3] | DW [Window =3] | MF [Window =10] | JPEG [Quality =30] | TVM |
|---|---|---|---|---|---|---|---|
| LAVAN | 0% | 72.10% | 68.50% | 65.50% | 60.90% | 51.20% | 11.40% |

FIG. 11

METHOD AND APPARATUS FOR HEURISTICALLY DEFENDING AGAINST LOCAL ADVERSARIAL ATTACK

CROSS REFERENCE TO RELATED APPLICATION

This patent application claims the benefit and priority of Chinese Patent Application No. 202310363416.9, filed with the China National Intellectual Property Administration on Apr. 7, 2023, the disclosure of which is incorporated by reference herein in its entirety as part of the present application.

TECHNICAL FIELD

The present disclosure relates to the field of image defense based on a deep neural network, and in particular, to a method and apparatus for heuristically defending against a local adversarial attack.

BACKGROUND

In recent years, in the field of image processing, as a deep neural network continuously develops, deep learning has accurately established a complex function model on an image dataset, gradually entered a practical application stage, and made remarkable achievements in many fields, such as face recognition, image segmentation, and autonomous driving.

However, a large number of experimental studies have shown that a small, imperceptible change in an original input sample causes the deep neural network to make misclassification with high confidence. In the prior art, image attack means are constantly evolving. At present, to reduce interference of external factors to attacks, adversarial patches are usually generated by modifying a few pixels in large quantities. An adversarial attack brings great challenges to an existing deep learning system. Improving robustness of a given deep learning network has become a hot topic in recent years. In terms of image attack defense, heuristic defense is introduced into the deep learning network. In the heuristic defense, digital watermarking (DW) and local gradients smoothing (LGS) can improve defense accuracy by approximately 20% to 30%. In the LGS algorithm, high-frequency noise is suppressed such that a classifier F is not affected by an adversarial patch, to ensure that the classifier F accurately recognizes a true class y of an input image x. LGS selects and suppresses local high-frequency noise to effectively eliminate interference of an adversarial patch to the classifier, and has become a classical defense method against local adversarial attacks.

However, in an experiment of the LGS algorithm, all adversarial patches are randomly placed in edge regions of images such that the patches cannot cover positions of original targets. Because a position of an adversarial patch is random in practical application, it is likely to cover some important features of a target object. In this case, when facing an original input sample, the LGS algorithm is easy to cause details of the original target to be lost. Finally, the classifier is difficult to effectively recognize the original target.

SUMMARY

The present disclosure is intended to resolve at least a technical problem in the prior art that an original target recognition rate of an LGS algorithm is low when an important feature of an original input sample is covered. In view of this, the present disclosure provides a method and apparatus for heuristically defending against a local adversarial attack through gradient optimization to improve classification accuracy of a deep neural network while suppressing an adversarial attack.

A method for heuristically defending against a local adversarial attack through gradient optimization according to an embodiment of the present disclosure includes:
processing an original image to obtain a gradient image;
selecting a noise region in the gradient image and suppressing the noise region to form a defense patch;
performing gradient enhancement on the original image to form a gradient-enhanced image;
projecting the defense patch onto the gradient-enhanced image to form a defense-processed image.

Preferably, the processing an original image specifically includes: calculating a first-order gradient of the original image.

The method for heuristically defending against a local adversarial attack through gradient optimization further includes:
determining whether a contrast in a first-order gradient image is great than a first preset threshold, and if the contrast is great than the first preset threshold, changing a gradient order number to n and calculating an $n^{th}$-order gradient of the original image, where n is greater than 1.

The suppressing the noise region includes:
performing, through a low-pass filter, gradient suppression on high-frequency noise in an image with the noise region marked to reduce a frequency of the noise and suppress the noise, to obtain the defense patch.

Preferably, the selecting a noise region in the gradient image and suppressing the noise region to form a defense patch includes:
dividing a first-order gradient image processed through a low-pass filter into k overlapping blocks with a same size, selecting the noise region based on a noise threshold, and performing gradient suppression on the noise region.

Preferably, the gradient suppression specifically includes: multiplying the noise region by a smoothing coefficient to obtain a suppression gradient, and subtracting the suppression gradient from the noise region.

A noise threshold adjustment coefficient is calculated based on an area attribute and a position attribute of the noise region in the gradient image. The noise threshold is calculated based on a product of the noise threshold adjustment coefficient and an initial noise threshold.

Preferably, the selecting the noise region based on a noise threshold includes:
comparing a ratio of a row vector of each column of each overlapping block to a dot product of the gradient image with the noise threshold, and if the ratio is greater than the noise threshold, marking the overlapping block as the noise region; or if the ratio is less than the noise threshold, marking the overlapping block as a non-noise region. The performing gradient enhancement on the original image specifically includes: obtaining a gradient of any point in the original image, multiplying the gradient by a gradient enhancement coefficient to obtain an enhancement gradient, and superimposing the enhancement gradient on the original image to implement gradient enhancement on the original image.

Preferably, the performing gradient enhancement on the original image to form a gradient-enhanced image specifically includes:

regarding the original image as a two-dimensional function f(x, y), and deriving any point (x, y) in the original image in x and y directions to obtain grayscale change rates as follows:

$$\frac{\partial f(x, y)}{\partial x} = f(x+1, y) - f(x, y) = g_x$$

$$\frac{\partial f(x, y)}{\partial y} = f(x, y+1) - f(x, y) = g_y$$

where $g_x$ and $g_y$ respectively represent gradients of the point (x, y) in the original image in the x and y directions.

Preferably, the original image is an attacked image. After the defense-processed image is formed, the method further includes: inputting the defense-processed image to an image classifier for classification, and identifying a target object in the image corresponding to the original image.

The present disclosure further provides an apparatus for heuristically defending against a local adversarial attack through gradient optimization, including:

a transformation module configured to process an original image to obtain a gradient image;

a suppression module configured to select a noise region in the gradient image and suppress the noise region to form a defense patch;

an enhancement module configured to perform gradient enhancement on the original image to form a gradient-enhanced image; and a defense module configured to project the defense patch onto the gradient-enhanced image to form a defense-processed image.

The present disclosure provides the method and apparatus for heuristically defending against a local adversarial attack through gradient optimization. The original image includes the target object and noise. The noise is effectively filtered out through a filter, and a noise suppression capability is improved. In addition, contour information of the target object is processed through gradient enhancement such that gradient details and texture features of the original sample are further highlighted. Image recognition accuracy is improved while an adversarial patch is suppressed. Compared with the prior art in which a heuristic defense problem exists, the present disclosure comprehensively utilizes two image gradient processing methods: gradient enhancement and gradient suppression. The low-pass filter and gradient enhancement ensure that the method provided in the present disclosure can enhance a contour of an original object and minimize impact of local adversarial noise and a defense algorithm on the original image while suppressing the local adversarial noise regardless of a patch position.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

FIG. 9 is a diagram of a comparison result of various algorithms in an adversarial patch defense experiment according to an embodiment of the present disclosure;

FIG. 11 is a diagram of a comparison result of various algorithms in a LaVAN defense experiment according to an embodiment of the present disclosure.

DETAILED DESCRIPTION OF THE EMBODIMENTS

The description of the embodiments of this specification should be combined with the corresponding accompanying drawings. The accompanying drawings should be considered a part of this specification. In the accompanying drawings, embodiments may be exaggerated in shape or thickness for simplicity or convenience. In addition, parts of each structure in the accompanying drawings will be separately described. It should be noted that elements that are not shown in the figures or described by text are in a form known to those of ordinary skill in the art.

In the description of the embodiments herein, any reference to a direction and an orientation is merely for convenience of description and should not be construed as limiting the protection scope of the present disclosure. The following description of preferred embodiments involves a combination of features. The features may exist independently or in combination. The present disclosure is not particularly limited to the preferred embodiments. The scope of the present disclosure is defined by the claims.

Figure 1:
FIG. 1 is a schematic diagram of a traditional digital attack according to an embodiment of the present disclosure.
Figure 1:
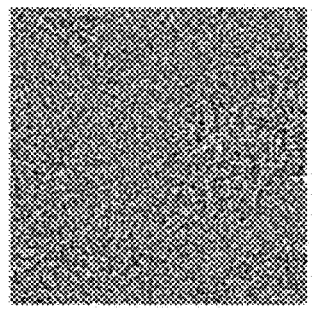
Figure 1:

As a deep neural network develops, an adversarial attack against the deep neural network is continuously enhanced. Adversarial attacks in the prior art are generally classified into a traditional adversarial attack and a local adversarial attack. Gradient ascent-based algorithms, such as a fast gradient sign method (FGSM), an iterative FGSM (I-GSM), and a diverse input iterative FGSM (DI2-FG), are commonly used in traditional attacks, as shown in FIG. 1. Such algorithms maximize a loss function to reach an attack target. However, small perturbations of human input are highly susceptible to many factors, such as an environment, lighting, a shooting device, and an angle.

Figure 2A:
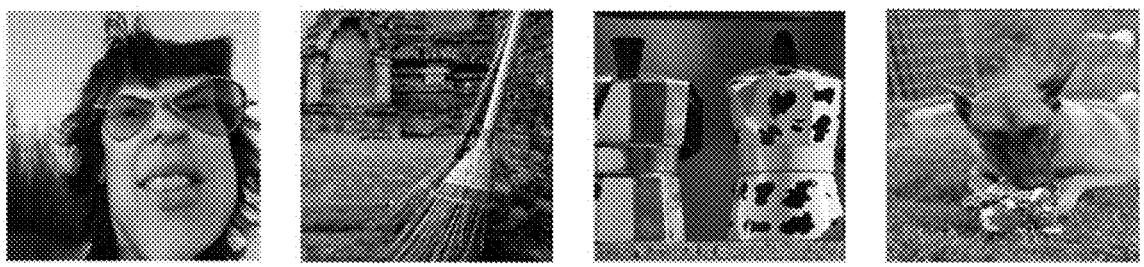
FIGS. 2A-B are schematic diagrams of an adversarial patch attack according to an embodiment of the present disclosure.
Figure 2B:
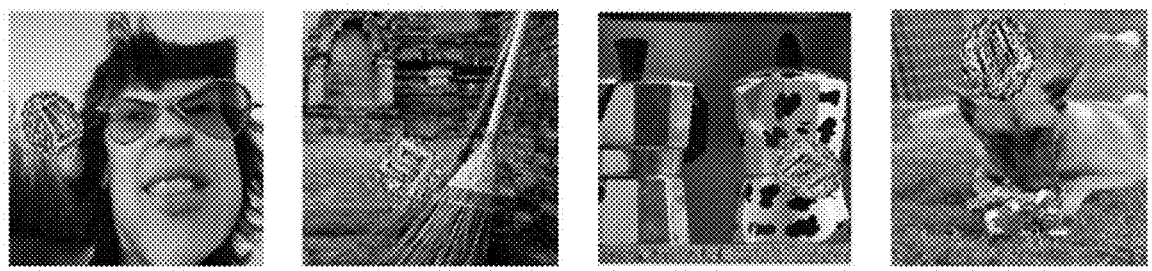
Figure 3A:
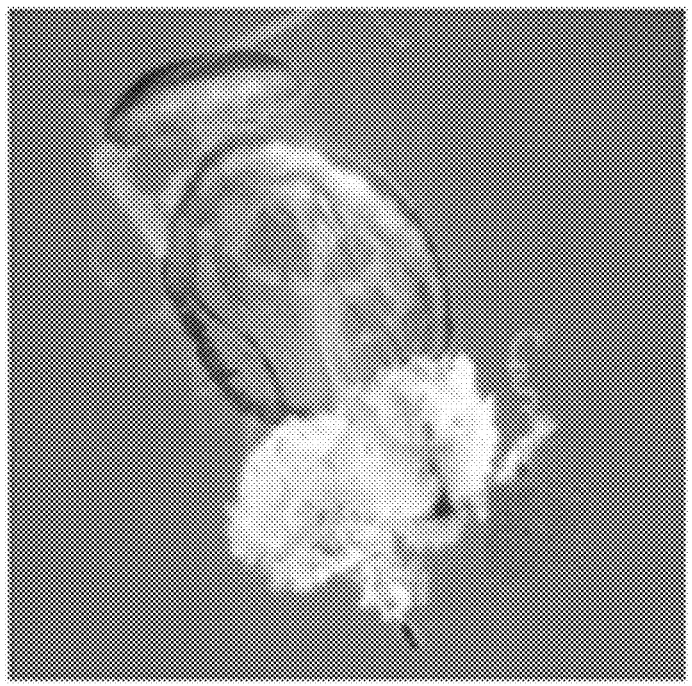
FIGS. 3A-D are schematic diagrams of a localized and visible adversarial noise (LaVAN) attack according to an embodiment of the present disclosure.
Figure 3B:
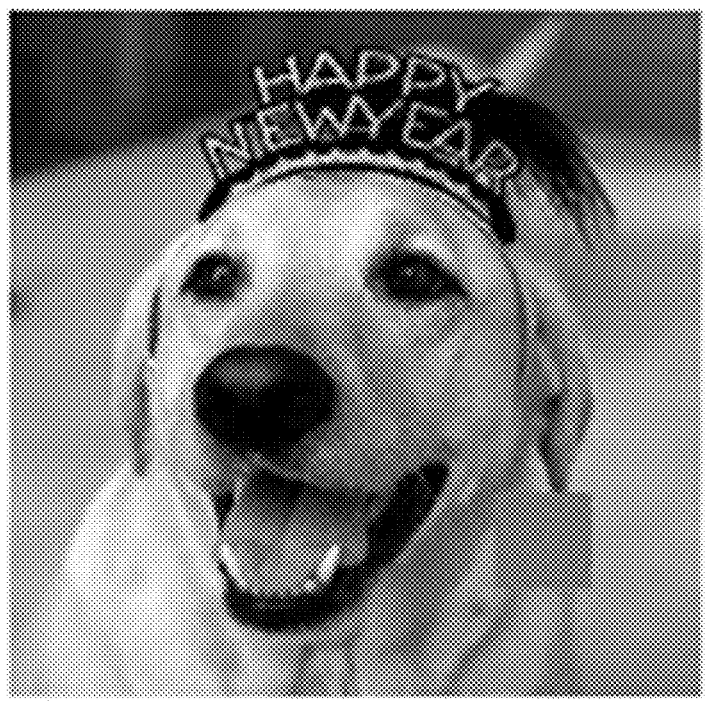
Figure 3C:
Figure 3D:

To make an attack algorithm work more effectively, a local adversarial attack is proposed in the prior art to reduce interference of external factors. FIGS. 2A-B show attack examples of an adversarial patch on an ImageNet2012 dataset. FIG. 2A shows an original class of images. FIG. 2B shows a target class displayed after an attack. The local adversarial attack generates an adversarial patch by modifying a few pixels in large quantities. Such algorithms can be arbitrarily applied in real-world scenarios. For example, an attacker may cover a face with designed glasses to deceive a face recognition system. In an autonomous driving application, an attacker may add a noise patch with a rectangular or circular pattern on a traffic sign to cause misclassification. As shown in FIGS. 3A-D, an adversarial patch LaVAN provides a visible but position-limited perturbation that does not cover a main target feature. 2% of pixels of an image are modified to form a patch that can be migrated and can attack a state-of-the-art Inceptionv3 network.

In the prior art, a method for defending against a local adversarial attack is generally DW defense. Defense is performed through two defense strategies: blind defense and non-blind defense. During non-blind defense, a defender needs to know a position of an adversarial patch in advance. However, in practical application, a position of a local adversarial attack is usually random. If the defender knows the position of the adversarial patch, a threat of the attack is immediately lifted. In an image repair process of blind defense, an experimental hypothesis is more realistic. The defender knows only a noise image, but does not know the position of the adversarial patch. The defender uses a saliency map to find a position of high-frequency noise through an attention mechanism, and before inputting the image to a classifier for classification, processes a noise region to suppress the noise.

An advantage of DW is that an algorithm can use a saliency map to effectively find a position of an adversarial patch. However, this is also a defect of defense because there is a high probability the saliency map provides a position of an original object in a clean example. A processed clean image greatly reduces recognition performance of a classifier. In a report of the defender on blind defense performance, 400 randomly selected images are tested through VGG19. In comparison with original samples, recognition accuracy of processed images decreases by 12%. It is difficult for DW to ensure classification accuracy of the classifier in practical application.

Figure 4A:
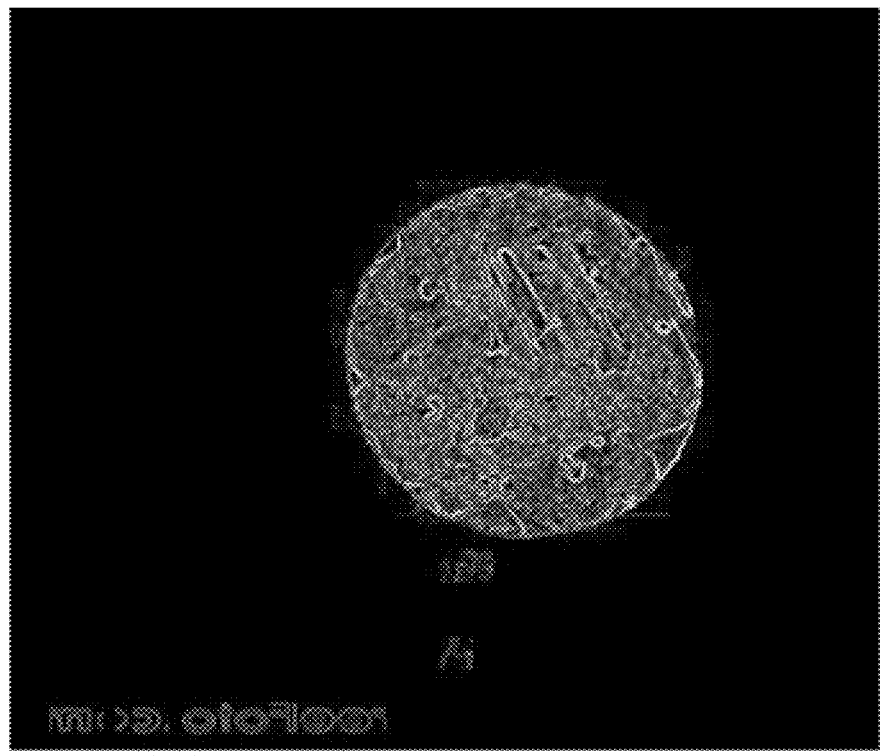
FIGS. 4A-B are schematic diagrams of an example of LGS high-frequency noise suppression according to an embodiment of the present disclosure.
Figure 4B:
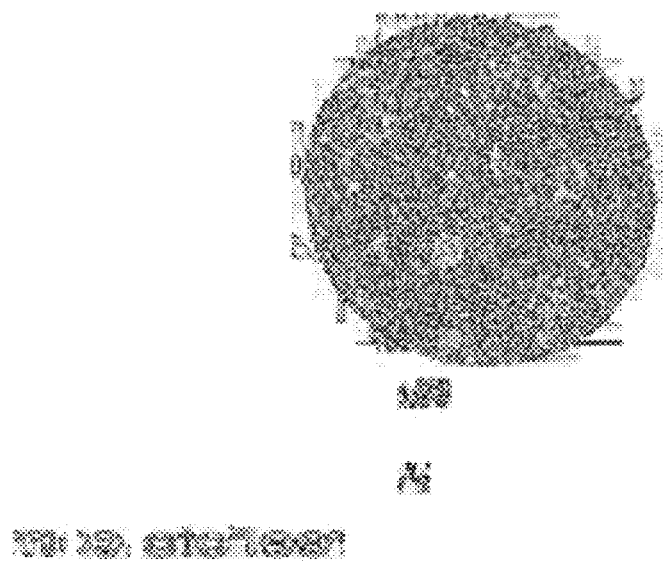

The essence of an adversarial patch attack is to introduce local high-frequency noise. A model preferentially pays attention to the high-frequency noise such that the classifier outputs a target class. Because accuracy of DW on clean images is greatly reduced, Muzammal Naseer et al. proposed a new defense mechanism, namely an LGS algorithm. As shown in FIGS. 4A-B, the algorithm can be summarized as remapping a scaled normalized gradient image to an original image after processing to suppress a high-frequency region. When Muzammal Naseer et al. used an Inception v3 model for test experiments, defense accuracy is 67.49% for attacks with an adversarial patch that occupies approximately 4% of an image. Recognition accuracy for clean images processed through a traditional LGS algorithm decreased by 5.59%. In comparison with DW, there is slight improvement but still a need for improvement.

In an experiment of the LGS algorithm, all adversarial patches are randomly placed in edge regions of images such that the patches cannot cover positions of original targets. Because a position of an adversarial patch is random in practical application, it is likely to cover some important features of a target object. In this case, when facing an original input sample, the LGS algorithm is easy to cause details of the original target to be lost. Finally, the classifier is difficult to effectively recognize the original target.

Figure 5:
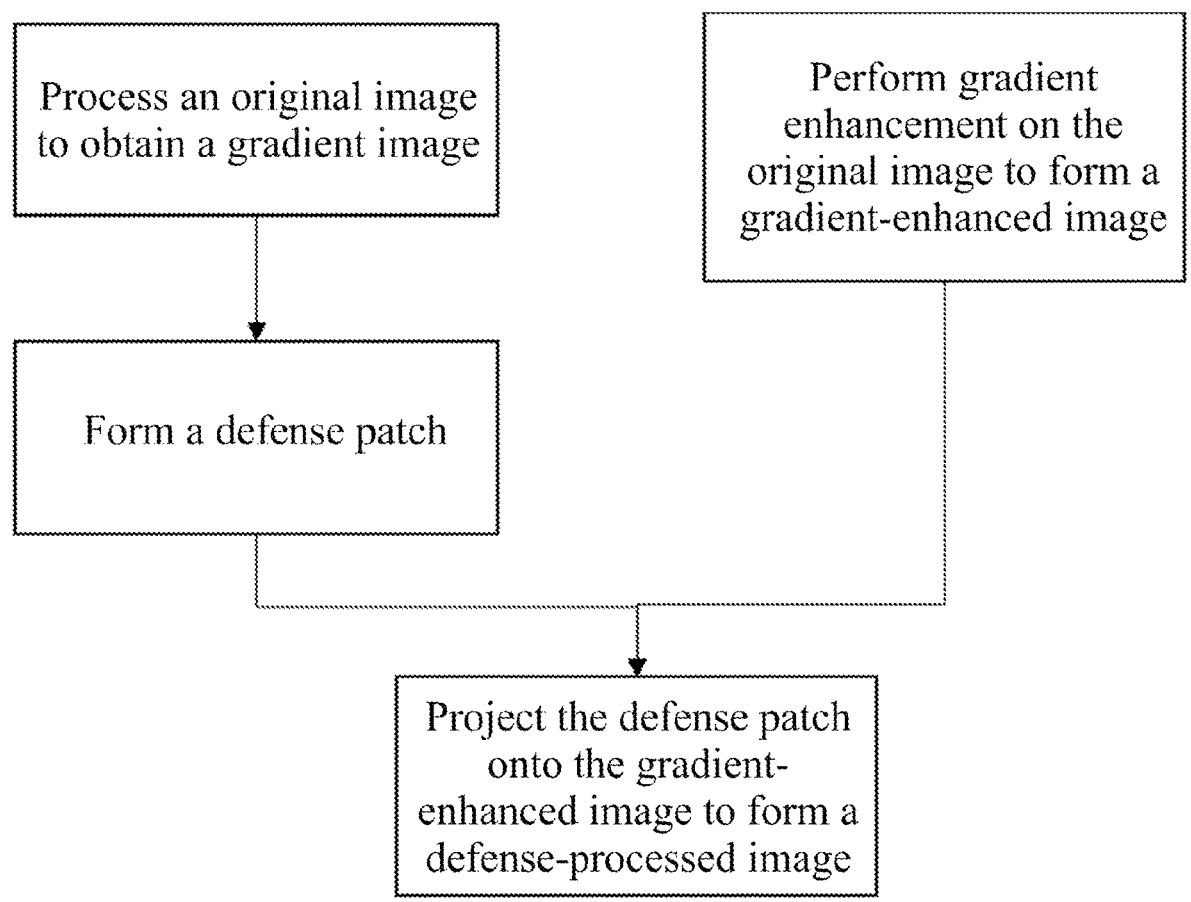
FIG. 5 is a schematic flowchart of a method for heuristically defending against a local adversarial attack through gradient optimization according to an embodiment of the present disclosure.
Figure 6A:
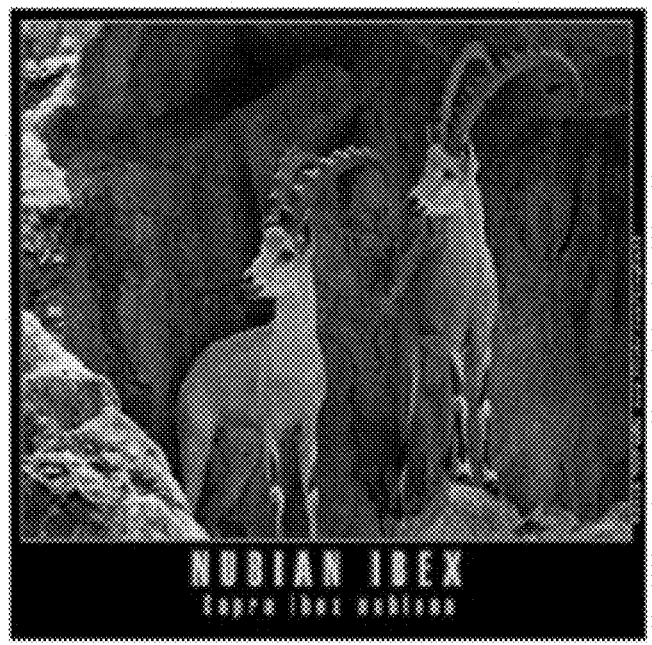
FIGS. 6A-F are comparison diagrams before and after a median filter is introduced according to an embodiment of the present disclosure.
Figure 6B:
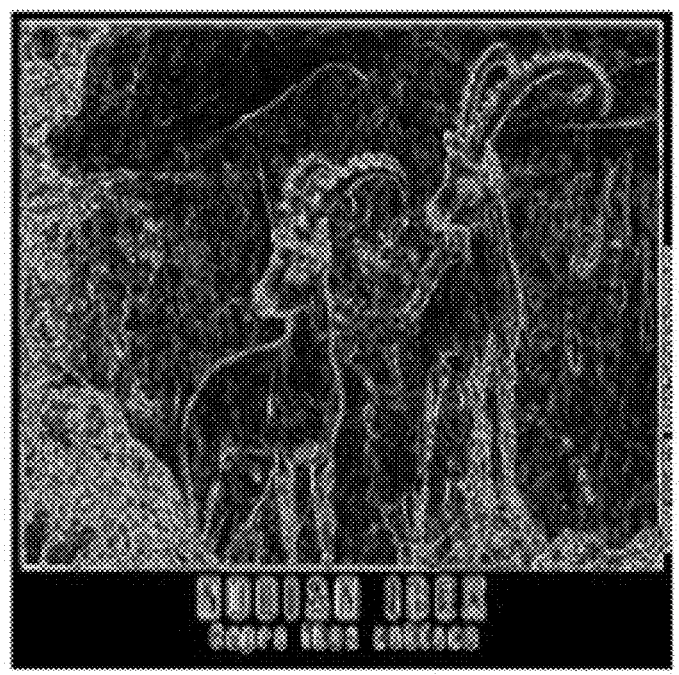
Figure 6C:
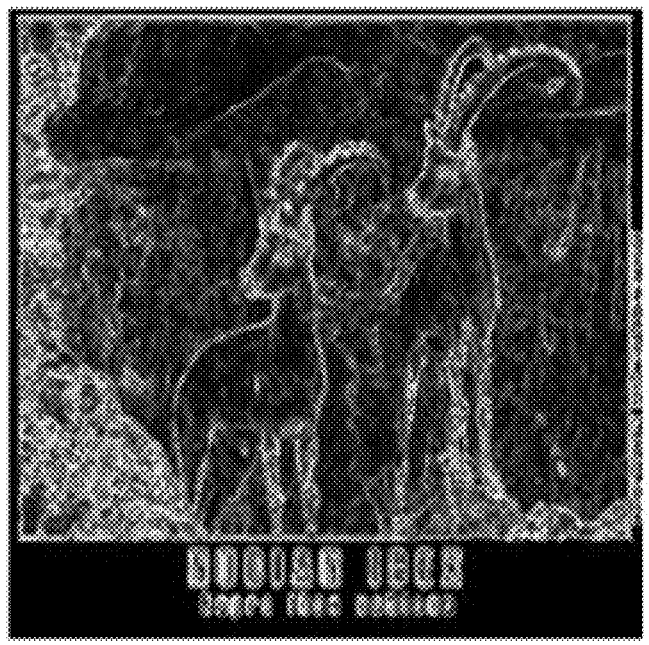
Figure 6D:
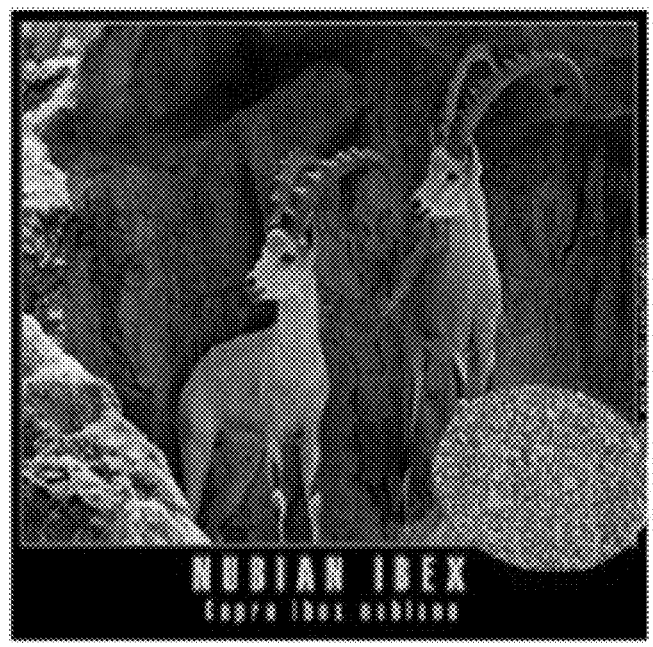
Figure 6E:
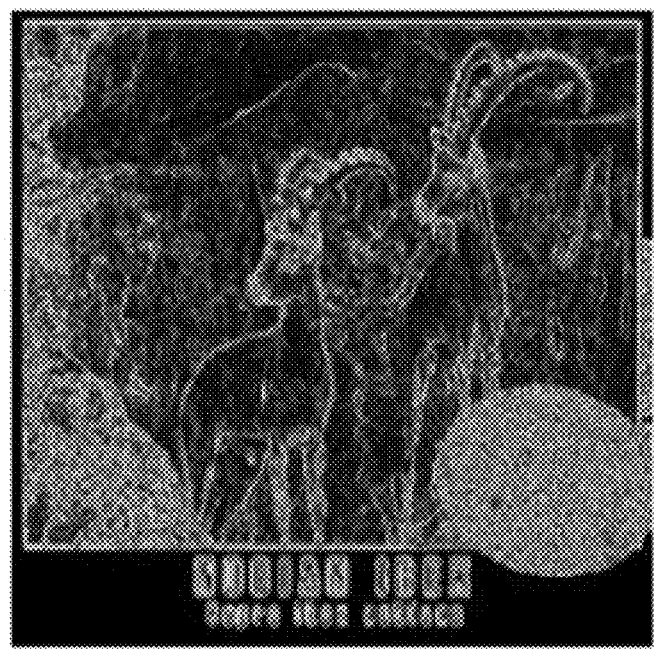
Figure 6F:
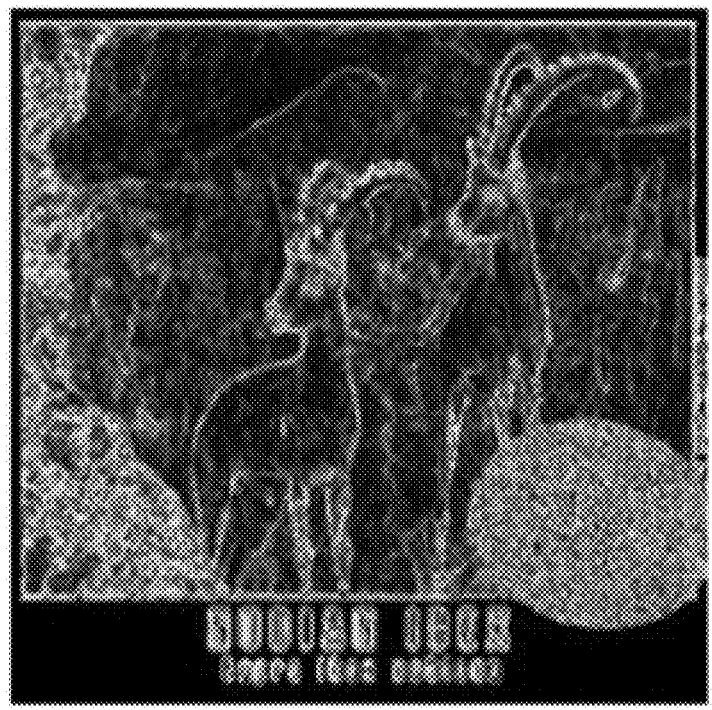

In view of the foregoing problem, as shown in FIG. 5, this embodiment provides a method for heuristically defending against a local adversarial attack through gradient optimization, including: processing an original image to obtain a gradient image; selecting a noise region in the gradient image and suppressing the noise region to form a defense patch; performing gradient enhancement on the original image to form a gradient-enhanced image; and projecting the defense patch onto the gradient-enhanced image to form a defense-processed image.

In some optional embodiments, the gradient image of the original image is calculated based on a Sobel operator. The Sobel operator can obtain a first-order gradient of the image, detect an edge of the image, and obtain a contour of the image. Specifically, the Sobel operator is a discrete difference operator used to calculate an approximate gradient of an image luminance function.

After the original image is processed to obtain the gradient image, the method further includes: Obtain a contour image of the original image based on a gradient of each pixel in the gradient image. Preferably, processing the original image specifically includes calculating the first-order gradient of the original image, but is not limited thereto. A high-order gradient such as a second-order gradient or a third-order gradient may be calculated based on an actual situation. The gradient of each pixel in the original image is calculated to obtain the gradient image. A boundary in the gradient image is clearer than that in the original image, to provide conditions for subsequently selecting the noise region. It can be understood that the method for heuristically defending against a local adversarial attack through gradient optimization further includes: Determine whether a contrast in a first-order gradient image is great than a first preset threshold. If the contrast is great than the first preset threshold, change a gradient order number to n and calculate an $n^{th}$-order gradient of the original image, where n is greater than 1. If the noise region is not significantly different from the first-order gradient image, a higher-order gradient image may be selected for calculation.

As shown in FIGS. 6A-F, selecting the noise region in the gradient image and suppressing the noise region to form the defense patch specifically includes: Filter each pixel in the gradient image, and mark a pixel position with noise greater than a noise threshold, to locate the noise region in the gradient image. Marking the pixel position with noise greater than the noise threshold may be marking the pixel position with noise greater than the noise threshold as 1 and marking a pixel position with noise less than the noise threshold as 0. The noise region is found by marking a position that may belong the noise region and setting a position that does not belong to the noise region as zero. An image with the noise region marked is obtained without changing an image size, and a non-noise region in the image is blank. Suppressing the noise region includes: Perform, through a low-pass filter, gradient suppression on high-frequency noise in the image with the noise region marked to reduce a frequency of the noise and suppress the noise, to obtain the defense patch. In real environments, images acquired by different devices in different environments are easily affected by blurring, noise pollution, and the like, resulting in differences in classification by a deep neural network for images of a same object acquired by different devices. To reduce impact of image noise caused by different devices on classification, the low-pass filter is used to replace normalization on images acquired by different devices. The low-pass filter can better protect a low-frequency region of the image while smoothing a high-frequency region of the image. This can effectively alleviate result deviation caused by selecting high-frequency noise. An attacked image contains a target object and noise information. In the method provided in the present disclosure, the noise information in the attacked image is first selected through the low-pass filter for enhancement and processing.

Because there are many filters with a low-pass characteristic, to better cooperate with the subsequent gradient enhancement, that is, to protect information of the image and highlight the noise information, a nonlinear median filter is used to process the image in the present disclosure. In some special cases, the nonlinear median filter can remove noise and protect an image edge, and has small impact on the edge of the original image and a better effect on alleviating the result deviation caused by selecting the high-frequency noise.

In the method for heuristically defending against a local adversarial attack through gradient optimization provided in the present disclosure, the first-order gradient image processed through the low-pass filter is divided into k overlapping blocks with a same size (Z). The noise region is selected based on the noise threshold (y). Gradient suppression is performed on the noise region. The gradient suppression specifically includes: Multiply the noise region by a smoothing coefficient to obtain a suppression gradient, and subtract the suppression gradient from the noise region: $\Phi(x)=1-\lambda*G_{h,w}$. In this way, gradient suppression is performed on the image with the noise region marked. $\lambda$ is the smoothing coefficient. $G_{h,w}$ is a noise region in row h and column w. $\Phi(x)$ is the defense patch. In a preferred embodiment, a noise threshold adjustment coefficient is calculated based on an area attribute and a position attribute of the noise region in the gradient image, and the noise threshold is calculated based on a product of the noise threshold adjustment coefficient and an initial noise threshold. The noise threshold adjustment coefficient is a product of a ratio of an area of the noise region in the gradient image to a first preset area and a reciprocal of a distance between a center point of the noise region and a center point of a target image in the original image. In the method for heuristically defending against a local adversarial attack through gradient optimization provided in the present disclosure, an appropriate threshold can be selected based on attacked states of different original images such that a noise suppression effect is obvious and recognition accuracy is improved. In a preferred embodiment, a noise type of the noise region is identified based on a pre-trained model. The smoothing coefficient corresponding to the original image is matched based on the noise type to control a suppression degree. In practical application, different smoothing coefficients are selected based on different high-frequency noise. In some embodiments, selecting the noise region includes: Compare a ratio of a row vector of each column of each overlapping block to a dot product of the gradient image with the noise threshold. If the ratio is greater than the noise threshold, mark the overlapping block as the noise region. If the ratio is less than the noise threshold, mark the overlapping block as a non-noise region.

The noise threshold controls accuracy of the selected noise region. For the same original image, a larger noise threshold indicates a larger selected noise region and more complete suppression of high-frequency noise. Similarly, a smaller noise threshold indicates a smaller selected noise region, and less coverage of the gradient-enhanced image and more displayed details of the original image when the defense patch is projected onto the gradient-enhanced image, and accuracy of the classifier is improved. It can be learned that selecting an appropriate threshold based on the states of different original images can make the noise suppression effect obvious and improve the recognition accuracy.

After the first-order gradient of the image is obtained, a traditional LGS algorithm normalizes the first-order gradient image of the whole image to ensure a subsequent accurate search for a position of the high-frequency noise. In real environments, images acquired by different devices in different environments are easily affected by blurring, noise pollution, and the like. To reduce impact of image noise on classification, the low-pass filter is used in the present disclosure to replace normalization in the prior art such that the low-frequency region of the image is better protected while the high-frequency region of the image is smoothed. This can effectively alleviate the result deviation caused by selecting the high-frequency noise.

Performing gradient enhancement on the original image specifically includes: Obtain a gradient of any point in the original image, multiply the gradient by a gradient enhancement coefficient to obtain an enhancement gradient, and superimpose the enhancement gradient on the original image to implement gradient enhancement on the original image. In a preferred embodiment, similar to the noise threshold, the gradient enhancement coefficient is calculated based on an attacked attribute of a target region in the gradient image. A product of an overlap ratio of the noise region in the original image and a target object region in the original image and the reciprocal of the distance between the center point of the noise region and the center point of the target image in the original image is used as a first adjustment coefficient. The gradient enhancement coefficient is obtained by multiplying the first adjustment coefficient by an original gradient enhancement coefficient. The gradient enhancement coefficient controls an enhancement degree. In practical application, different gradient enhancement coefficients are selected based on different attacked states of the target object. This improves the protection strength of the target object's information and further enhances the recognition accuracy of the target object. In another aspect of the method provided in the present disclosure, contour information of the target object is processed through gradient enhancement such that gradient details and texture features of an original sample are further highlighted. In combination with the step of forming the defense patch, image recognition accuracy is improved while an adversarial patch is suppressed.

Figure 7A:
FIGS. 7A-C are comparison diagrams before and after image gradient enhancement according to an embodiment of the present disclosure.
Figure 7B:
Figure 7C:

As shown in FIGS. 7A-C, performing gradient enhancement on the original image to form the gradient-enhanced image specifically includes: Regard the original image as a two-dimensional function f(x, y), and solve a differential of f(x, y) to x and a differential of f(x, y) to y from the two-dimensional function f(x, y). In other words, any point (x, y) in the original image in x and y directions is derived to obtain grayscale change rates as follows:

$$\frac{\partial f(x, y)}{\partial_x} = \lim_{\delta \to 0} \frac{f(x+\delta, y) - f(x, y)}{\delta}$$

$$\frac{\partial f(x, y)}{\partial y} = \lim_{\delta \to 0} \frac{f(x, y+\delta) - f(x, y)}{\delta}$$

$\delta$ is a pixel increment, x is position information in the x direction, and y is position information in the y direction. $\delta$ cannot be infinitely small because the image is discretized by pixel and f(x, y) of the image is a discontinuous two-dimensional function. For the original image without normalization, a minimum value of $\delta$ is 1 pixel. Therefore, calculation formulas of the grayscale change rates are as follows ($\delta=1$):

$$\frac{\partial f(x, y)}{\partial x} = f(x+1, y) - f(x, y) = g_x$$

$$\frac{\partial f(x, y)}{\partial y} = f(x, y+1) - f(x, y) = g_y$$

$g_x$ and $g_y$ respectively represent gradients of the point (x, y) in the image in the x and y directions. The gradients of the point (x, y) in the image in the x and y directions are equivalent to differences between two adjacent pixels. To simplify a calculation amount, an approximate gradient of the point (x, y) in the image is obtained by performing weighting on absolute values of $g_x$ and $g_y$ in the present disclosure.

$x'=x+\theta(|g_x|+|g_y|)$, where $\theta$ is the gradient enhancement coefficient, which is used to control the gradient enhancement degree and finally implement gradient enhancement.

In the present disclosure, gradient enhancement is performed on the original image. Before $\Phi(x)$ mapping, gradient enhancement is performed on an input image x such that important features of an original object such as a contour and texture are improved, attention of the deep neural network to the original object is more concentrated, and recognition accuracy of the classifier is further improved.

When the defense patch is projected onto the gradient-enhanced image to form the defense-processed image, a size of the defense patch is consistent with that of the gradient-enhanced image. That is, after the defense patch is projected onto the gradient-enhanced image, suppressed noise in the defense patch covers high-frequency noise in the gradient-enhanced image to suppress the high-frequency noise. In addition, because the non-noise region in the defense patch is marked as zero, a contour and texture in the gradient-enhanced image is not changed after mapping.

Further, the original image is an attacked image. After the defense-processed image is formed, the method further includes: Input the defense-processed image to an image classifier for classification, and identify the target object in the image corresponding to the original image. In this case, because the defense-processed image does not contain high-frequency noise, the deep neural network is not attracted by the high-frequency noise to make misclassification, and image recognition accuracy is improved.

In the method for heuristically defending against a local adversarial attack through gradient optimization (LAAGO for short) provided in the present disclosure, an adversarial patch is suppressed. In addition, a gradient image of a scaled selected noise region is processed and mapped to the gradient-enhanced image, to suppress a high-frequency noise region in the original image. In this way, image recognition accuracy is improved while the adversarial patch is suppressed.

Figure 8A:
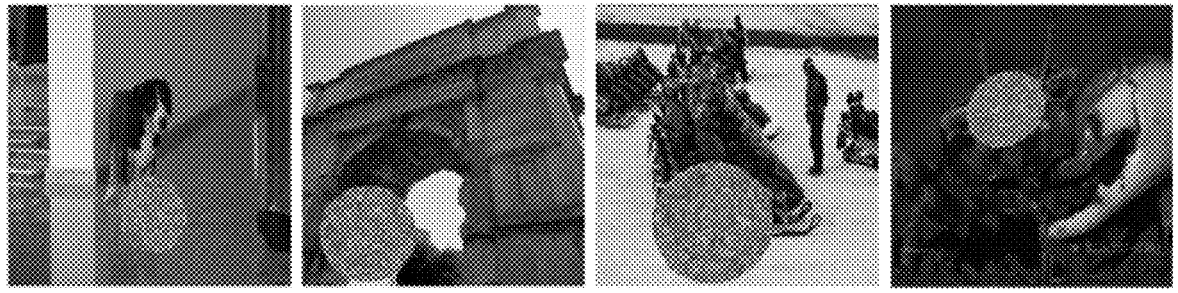
FIGS. 8A-B are comparison diagrams before and after an algorithm for heuristically defending against a local adversarial attack through gradient optimization is used according to an embodiment of the present disclosure.
Figure 8B:
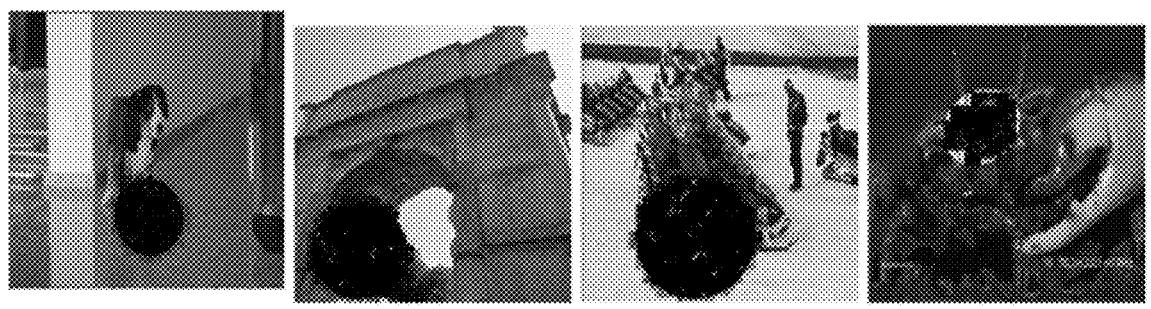

Specifically, processing the original image to obtain the gradient image includes: Calculate the gradient of the original image to obtain the contour image of the original image; and screen the gradient image to find the noise region. The image with the noise region marked is obtained through screening without changing the size of the image, and the non-noise region in the image is blank. Gradient suppression is performed on the image with the noise region marked to reduce the frequency of the noise and suppress the noise, to obtain the defense patch. Gradient enhancement on the original image can enhance the contour of the original image such that the deep neural network can pay attention to contour and texture features of the original object and the classification accuracy of the classifier is improved. When the defense patch is projected onto the gradient-enhanced image, the size of the defense patch is consistent with that of the gradient-enhanced image. That is, after the defense patch is projected onto the gradient-enhanced image, the suppressed noise in the defense patch covers the high-frequency noise in the gradient-enhanced image to suppress the high-frequency noise. In addition, because the non-noise region in the defense patch is marked as zero, the contour and texture in the gradient-enhanced image is not changed after mapping. Then, the defense-processed image is input to the classifier for classification. In this case, because the defense-processed image does not contain high-frequency noise, the deep neural network is not attracted by the high-frequency noise to make misclassification, as shown in FIGS. 8A-B. Therefore, the present disclosure not only suppresses the high-frequency noise and prevents the deep neural network from being attracted by the high-frequency noise to make misjudgment, to suppress the adversarial patch, but also enhances the contour and texture of the original image by performing gradient enhancement on the original image, facilitates recognition by the classifier, and improves image recognition accuracy. In the present disclosure, when an adversarial sample with local noise is processed through the LAAGO method, a position of an adversarial patch is not clearly limited, and there is a high probability that the patch covers remarkable details of a part of an original object. The present disclosure comprehensively utilizes two image gradient processing methods: gradient enhancement and gradient suppression. The low-pass filter and gradient enhancement ensure that the method provided in the present disclosure can enhance a contour of an original object and minimize impact of local adversarial noise and a defense algorithm on the original image while suppressing the local adversarial noise regardless of a patch position.

An embodiment of the present disclosure further provides an apparatus for heuristically defending against a local adversarial attack through gradient optimization, which includes: a transformation module configured to process an original image to obtain a gradient image; a suppression module configured to select a noise region in the gradient image and suppress the noise region to form a defense patch; an enhancement module configured to perform gradient enhancement on the original image to form a gradient-enhanced image; and a defense module configured to project the defense patch onto the gradient-enhanced image to form a defense-processed image.

To compare a defense effect of the present disclosure with that of a traditional defense method, an embodiment of the present disclosure provides a comparative experiment.

Specifically, the present application uses an Inception v3 model in a traditional defense algorithm to test defense against adversarial patch attacks. Like the traditional defense algorithm, all attacks in the present application are performed in a white-box setting. In the experiment of the present application, an ImageNet 2012 dataset is selected. There are 50,000 images in the dataset. In the traditional defense algorithm, 1,000 adversarial samples are selected as an experimental dataset. To prevent patches from covering remarkable details in images, the patches are all placed in edge regions of the images in the traditional defense algorithm. This obviously does not conform to practical application. To make data more accurate, adversarial patches are completely randomly placed in the images in the present application. In addition, each image is iteratively optimized for a plurality of times. A success rate of adversarial patch attacks reaches more than 99%. An adversarial dataset that contains 2,000 iteratively optimized images is selected. A success rate of the dataset is at least 96% for an attack target class of adversarial patches. An optimal threshold is selected based on an average stride that ranges from 0 to 1.2 after 30 experiments.

Specifically, the experiment (LAAGO for short) of the present disclosure is compared with experiments of a traditional LGS algorithm, Joint Photographic Experts Group (JPEG) compression, total variation minimization (TVM), Gaussian filtering (GF), median filtering (MF), and DW. All experiments are performed on a Windows computer with an i7-10700k eight-core CPU running at 4.20 GHz and 32 GB of memory.

Figure 10:
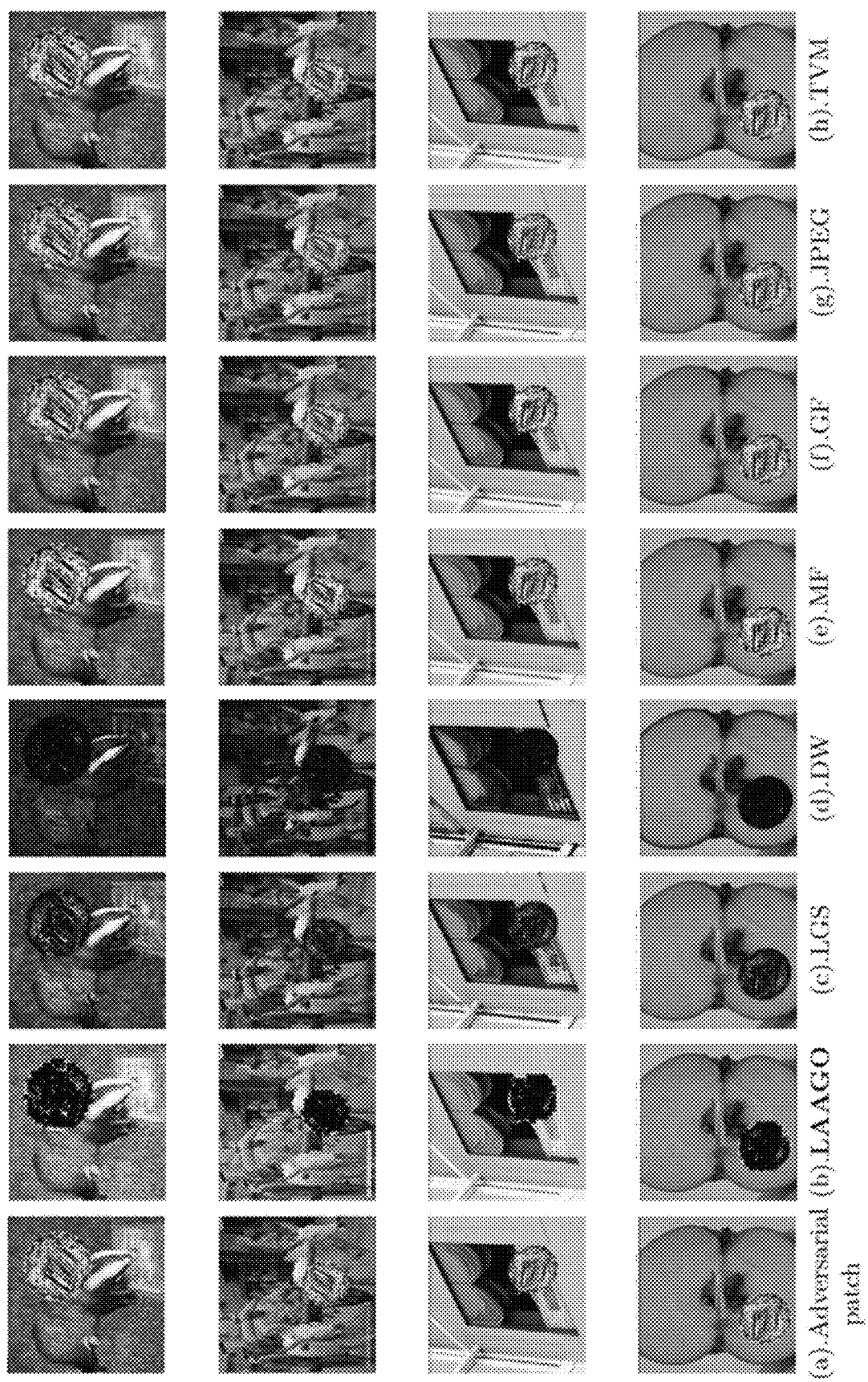
FIG. 10 is a diagram of displayed results of adversarial patch defense according to an embodiment of the present disclosure.

In this experiment, a 400×400 image is input to the Inception v3 model. A size of an adversarial patch is set to 70×70 (approximately 3% of the image), 80×80 (approximately 4% of the image), and 120×120 (approximately 10% of the image) to verify the proposed method. Processing results of the algorithms are shown in FIG. 9 and FIG. 10.

Research shows that deep learning pays more attention to object texture features in object recognition. To further elaborate an attack characteristic of an adversarial patch, a gradient smoothing algorithm is used in this experiment. After high-frequency noise is selected, the gradient smoothing algorithm is used in a local high-frequency noise region. The gradient smoothing algorithm eliminates relevant texture information of the adversarial patch. However, experimental results in FIG. 10 show that an expected defense effect is not achieved. A reason is that although the adversarial patch becomes invalid, in comparison with the original image, the high-frequency noise still interferes with the model to make correct judgment. Apparently, it is not enough to only eliminate texture details of the patch. Therefore, just as an algorithm for heuristically defending against a local adversarial attack through gradient optimization is used in the present application, there is a need to improve gradient strength of the original object while directly suppressing abnormal high-frequency noise during defense against local adversarial noise.

In the present application, methods such as JPEG compression and TVM denoising are used to perform a comparative experiment. The experiment proves that the traditional defense methods have a small effect on patch attacks. Results show that the traditional defense methods are not effective against patch attacks. Heuristic defense methods such as DW are more effective than the traditional defense methods, but masks some details when processing clean examples, resulting in a poor recognition effect in case of no attacks. Experimental results demonstrate advantages of the method for heuristically defending against a local adversarial attack through gradient optimization over other defense methods. The LGS algorithm reduces recognition accuracy of clean examples from 78.24% to 72.65% by 5.59%, whereas the algorithm for heuristically defending against a local adversarial attack through gradient optimization reduces accuracy only by 0.3%.

Figure 12:
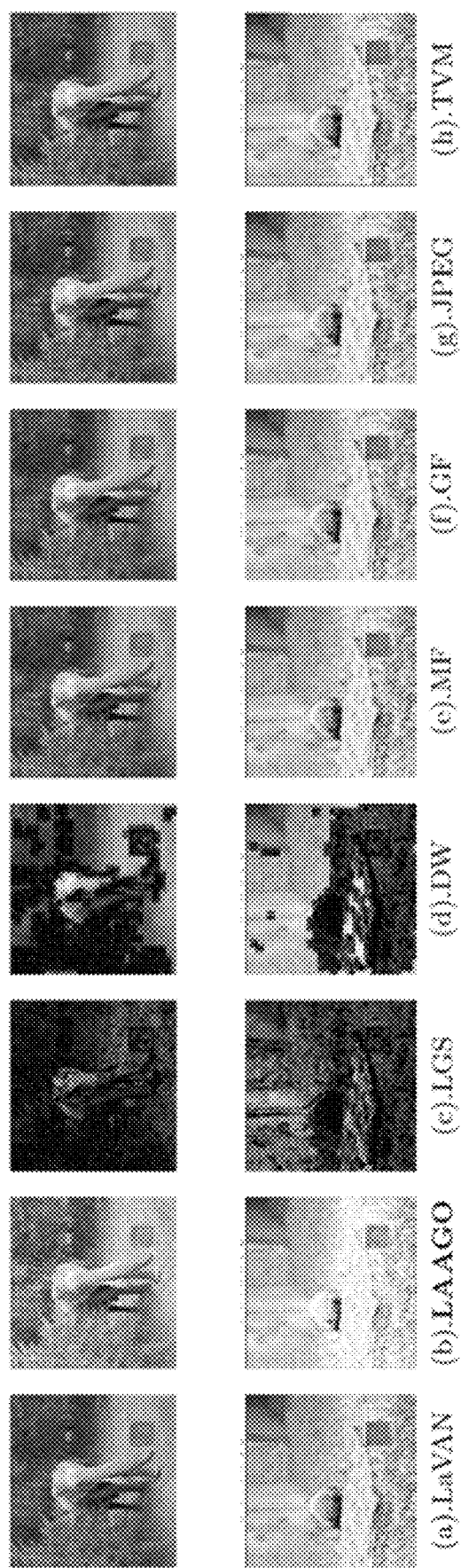
FIG. 12 is a diagram of LaVAN defense results according to an embodiment of the present disclosure.

Similarly, a defense experiment against the LaVAN patch attack algorithm is further conducted. It is proved that LaVAN can attack any position of the image. In addition, a patch size is much smaller than a size of an adversarial patch. Defense accuracy of the algorithm for heuristically defending against a local adversarial attack through gradient optimization is also applicable to such attacks. In the experiment, a 299×299 image is input to the Inception v3 model, and a LaVAN patch with a size of 42×42 (approximately 2% of the image) is used. In the experiment, the LaVAN patch is fixed at a position (210, 210). Experimental results are shown in FIG. 11 and FIG. 12.

As shown in FIG. 11, because there is no extensive high-frequency noise in a LaVAN attack, traditional denoising algorithms, such as JPEG compression and MF, may have a specific smoothing effect on LaVAN, but still have limitations. A difference of the algorithm for heuristically defending against a local adversarial attack through gradient optimization is that the algorithm not only performs gradient suppression in a noise region, but also highlights target features through gradient enhancement. FIG. 12 illustrates an advantage of the algorithm for heuristically defending against a local adversarial attack through gradient optimization in filtering out a local adversarial patch over LGS and DW. The algorithm for heuristically defending against a local adversarial attack through gradient optimization effectively protects features of the original target and improves classification accuracy. Therefore, in the face of LaVAN attacks with stronger camouflage, the algorithm for heuristically defending against a local adversarial attack through gradient optimization still shows good defense performance, and a defense effect reaches 72.10%.

In the present application, defense against a local adversarial attack is enhanced through the study of attack characteristics in the gradient domain. A traditional heuristic algorithm often has great impact on an original image, and is difficult to implement in practical application. In the present application, a high-frequency region of an image is first smoothed through a low-pass filter to ensure that the high-frequency region is not affected by an external environment, light, or a device, to reduce an error that may be caused by selecting high-frequency noise. In addition, the algorithm for heuristically defending against a local adversarial attack through gradient optimization enhances gradient texture details of an original object and improves attention of a deep neural network to the original object. Therefore, classification accuracy of the classifier and algorithm robustness are effectively improved. Future work will focus on improving accuracy of the algorithm for heuristically defending against a local adversarial attack through gradient optimization during a search for high-frequency noise, and dynamically adjusting a screening threshold, a smoothing coefficient, and an enhancement coefficient of images with different sizes to achieve end-to-end defense in practical application.

The foregoing descriptions are merely preferred embodiments of the present disclosure, and not intended to limit the present disclosure. Any modifications, equivalent replacements, improvements, and the like made within the spirit and principle of the present disclosure shall all fall within the protection scope of the present disclosure.

What is claimed is:

1. A method for heuristically defending against a local adversarial attack through gradient optimization, comprising:

processing an original image to obtain a gradient image;

selecting a noise region from the gradient image and suppressing the noise region to form a defense patch, wherein high-frequency noise gradient suppression is achieved using a low-pass filter on the gradient image with the noise region marked, the gradient image processed through the low-pass filter is divided into k overlapping blocks of a same size, the noise region is selected based on a noise threshold, and high-frequency noise gradient suppression is performed on the noise region;

the high-frequency noise gradient suppression specifically comprises: multiplying the noise region by a smoothing coefficient to obtain a suppression gradient, and subtracting the suppression gradient from the noise region; and a noise threshold adjustment coefficient is calculated based on an area attribute and a position attribute of the noise region in the gradient image, and the noise threshold is determined by multiplying the noise threshold adjustment coefficient with an initial noise threshold;

performing gradient enhancement on the original image to form a gradient-enhanced image, wherein the gradient enhancement is implemented on the original image by obtaining a gradient of any point in the original image, multiplying the gradient by a gradient enhancement coefficient to obtain an enhancement gradient, and superimposing the enhancement gradient on the original image; and projecting the defense patch onto the gradient-enhanced image to form a defense-processed image.

2. The method for heuristically defending against a local adversarial attack through gradient optimization according to claim 1, wherein the processing an original image specifically comprises: calculating a first-order gradient of the original image; and the method for heuristically defending against a local adversarial attack through gradient optimization further comprises:

determining whether a contrast in a first-order gradient image is great than a first preset threshold, and if the contrast is great than the first preset threshold, changing a gradient order number to n and calculating an $n^{th}$-order gradient of the original image, wherein n is greater than 1.

3. The method for heuristically defending against a local adversarial attack through gradient optimization according to claim 1, wherein the selecting the noise region based on a noise threshold comprises:

comparing a ratio of a row vector of each column of each overlapping block to a dot product of the gradient image with the noise threshold, and if the ratio is greater than the noise threshold, marking the overlapping block as the noise region; or if the ratio is less than the noise threshold, marking the overlapping block as a non-noise region.

4. The method for heuristically defending against a local adversarial attack through gradient optimization according to claim 1, wherein the performing gradient enhancement on the original image to form a gradient-enhanced image specifically comprises:

regarding the original image as a two-dimensional function f(x, y), and deriving any point (x, y) in the original image in x and y directions to obtain grayscale change rates as follows:

$$\frac{\partial f(x, y)}{\partial x} = f(x+1, y) - f(x, y) = g_x$$

$$\frac{\partial f(x, y)}{\partial y} = f(x, y+1) - f(x, y) = g_y$$

wherein $g_x$ and $g_y$ respectively represent gradients of the point (x, y) in the original image in the x and y directions.

5. The method for heuristically defending against a local adversarial attack through gradient optimization according to claim 1, wherein the original image is an attacked image, and after the defense-processed image is formed, the method further comprises: inputting the defense-processed image to an image classifier for classification, and identifying a target object in the image corresponding to the original image.

6. An apparatus for heuristically defending against a local adversarial attack through gradient optimization, comprising:

a transformation module configured to process an original image to obtain a gradient image;

a suppression module configured to select a noise region in the gradient image and suppress the noise region to form a defense patch; wherein high-frequency noise gradient suppression is performed through a low-pass filter on the gradient image with the noise region marked, the gradient image processed through the low-pass filter is divided into k overlapping blocks with a same size, the noise region is selected based on a noise threshold, and high-frequency noise gradient suppression is performed on the noise region;

the high-frequency noise gradient suppression specifically comprises: multiplying the noise region by a smoothing coefficient to obtain a suppression gradient, and subtracting the suppression gradient from the noise region; and a noise threshold adjustment coefficient is calculated based on an area attribute and a position attribute of the noise region in the gradient image, and the noise threshold is determined by multiplying the noise threshold adjustment coefficient with an initial noise threshold;

an enhancement module configured to perform gradient enhancement on the original image to form a gradient-enhanced image, wherein the gradient enhancement is implemented on the original image by obtaining a gradient of any point in the original image, multiplying the gradient by a gradient enhancement coefficient to obtain an enhancement gradient, and superimposing the enhancement gradient on the original image; and a defense module configured to project the defense patch onto the gradient-enhanced image to form a defense-processed image.

* * * * *